(12) United States Patent
Kelkar et al.

(10) Patent No.: US 8,391,455 B2
(45) Date of Patent: Mar. 5, 2013

(54) METHOD AND SYSTEM FOR LIVE COLLABORATIVE TAGGING OF AUDIO CONFERENCES

(75) Inventors: Shreeharsh Arvind Kelkar, Summit, NJ (US); Ajita John, Holmdel, NJ (US); Doree Duncan Seligmann, New York, NY (US)

(73) Assignee: Avaya Inc., Basking Ridge, NJ (US)

( * ) Notice: Subject to any disclaimer, the term of this patent is extended or adjusted under 35 U.S.C. 154(b) by 333 days.

(21) Appl. No.: 12/818,385

(22) Filed: Jun. 18, 2010

(65) Prior Publication Data

US 2011/0228921 A1 Sep. 22, 2011

Related U.S. Application Data

(60) Provisional application No. 61/314,738, filed on Mar. 17, 2010.

(51) Int. Cl.
*H04M 3/42* (2006.01)
(52) U.S. Cl. .................. 379/202.01; 370/261; 709/204; 709/227
(58) Field of Classification Search ............. 379/202.01; 370/261; 709/204, 227
See application file for complete search history.

(56) References Cited

U.S. PATENT DOCUMENTS

| | | | |
|---|---|---|---|
| 2002/0078088 A1 | 6/2002 | Kuruoglu et al. | |
| 2004/0236830 A1 | 11/2004 | Nelson et al. | |
| 2004/0249884 A1 | 12/2004 | Caspi et al. | |
| 2005/0034079 A1* | 2/2005 | Gunasekar et al. | 715/753 |
| 2007/0282948 A1 | 12/2007 | Praino et al. | |

FOREIGN PATENT DOCUMENTS

GB 2319138 5/1998

OTHER PUBLICATIONS

Stifelman et al., "The Audio Notebook", "CHI 2001 Seattle, Washington", Mar. 31-Apr. 4, 2001, Publisher: Association for Computing Machinery (ACM).
Moran et al., "'I'll Get That Off the Audio': A Case Study of Salvaging Multimedia Meeting Records", "CHI '97 Atlanta, GA", 1997, Publisher: ACM.
Renduchintala et al., "Designing for Persistent Audio Conversations in the Enterprise", "DUX '07 Chicago 2007", Publisher: AIGA.

(Continued)

*Primary Examiner* — Quynh Nguyen

(57) ABSTRACT

Methods are disclosed in which participants in a communication session contribute tags—during the course of the communication session—such that the tags are visible to at least some of the participants as the communication session progresses. This creates a "live" collaborative tagging environment.

Tags are contributed by some or all the participants on the communication session. The tags are displayed as they are generated. Moreover, one who declines to speak on the communication session can still actively tag. In this way, a tagger can participate and contribute in a collaborative live manner while the communication session is in progress. This approach departs from traditional "after the fact" or "note-taking" techniques in the prior art.

The tags, according to some illustrative embodiments of the present invention, can be associated in a variety of ways, including but not limited to: a tag that is associated with an instance in time of the recording of the communication session; a tag that is associated with the recording as a whole; a tag that is associated with a period of time of the recording of the communication session, wherein the period of time is of a predetermined duration; a tag that is associated with a period of time of the recording of the communication session, wherein the period of time is under the control of the person contributing the tag. The tags are searchable and browsable and can be classified.

22 Claims, 11 Drawing Sheets

OTHER PUBLICATIONS

"Off the Top—Folksonomy Definition and Wikipedia", "http://www.vanderwal.net/random/entrysel.php?blog=1750 Last visited Jun. 18, 2010", , Publisher: vanderwal.net.

"Folksonomy—Wikipedia, the free encyclopedia", "http://en.wikipedia.org/wiki/Folksonomy Last visited Jun. 18, 2010", , Publisher: Wikimedia Foundation, Inc.

Marlow et al., "HT06, Tagging Paper, Taxonomy, Flickr, Academic Article, ToRead", "Conference on Hypertext and Hypermedia Odense, Denmark 2006", , Publisher: ACM.

Kelkar et al., "Some Observations on the 'Live' Collaborative Tagging of Audio Conferences in the Enterprise", "Conference on Human Factors in Computing Systems CHI 2010 Atlanta, Georgia", Apr. 10-15, 2010, Publisher: Association for Computing Machinery (ACM).

Shirky, Clay, "Here Comes Everybody: The Power of Organizing without Organizations", "(Book)", 2008, Publisher: Penguin Press.

"Adobe Premiere Pro CS4 Video Tutorial—Using Speech Search to speed editing", "http://www.adobe.com/designcenterpremierepro/articles/Irvid4070_pr.html Last visited Jun. 18, 2010", , Publisher: Adobe Systems Incorporated.

"Livescribe:: Never Miss a Word—Smartpen", "http://www.livescribe.com/smartpen/techspecs.html Last visited Jun. 18, 2010", , Publisher: Livescribe, Inc.

Kalnikaite et al., "Social Summarization: Does Social Feedback Improve Access to Speech Data?", "Computer Supported Cooperative Work CSCW '08 San Diego, California", Nov. 8-12, 2008, Publisher: ACM.

Golder et al., "The Structure of Collaborative Tagging Systems", "Information Dynamics Lab", , Publisher: HP Labs, Jun. 18, 2010.

Golder et al., "Usage patterns of collaborative tagging systems", "Journal of Information Science", 2006, pp. 198-208, vol. 32, No. 2, Publisher: Chartered Institute of Library and Information Professionals CILIP.

Seligmann et al., "Why Tag Conversations?", "International Conference on Collaborative Computing: Networking, Applications and Worksharing NY 2007".

Adithya et al., "Designing for Persistent Audio Conversations in the Enterprise", Proceedings of the 2007 Conference on Designing for User eXperiences, Article 11, pp. 2-10, DUX'07, 2007.

Kelkar et al., "Collaborative Tagging and Persistent Audio Conversations", European Conference on Computer-Supported Cooperative Work, Limerick, Ireland, Sep. 24-29, 2007.

* cited by examiner

METHOD AND SYSTEM FOR LIVE COLLABORATIVE TAGGING OF AUDIO CONFERENCES

CROSS REFERENCE TO RELATED APPLICATIONS

This application claims the benefit of U.S. provisional application No. 61/314,738, filed on 17 Mar. 2010, entitled "Method and System for Live Collaborative Tagging of Audio Conferences.". The concepts, but not necessarily the nomenclature, of this provisional application are incorporated by reference herein.

If there are any contradictions or inconsistencies between this application and one or more of the cases that have been incorporated by reference, the claims in the present case should be interpreted to be consistent with the language in this case.

FIELD OF THE INVENTION

The present invention relates to telecommunications in general, and, more particularly, teleconferencing.

BACKGROUND OF THE INVENTION

Communication sessions among several people are a commonplace form of communication today. Such communication sessions are sometimes known as conference calls, teleconferences, multi-party calls, meet-me conferences, audio conferences, etc. Communication sessions can take many forms, such as audio, video, or multi-media. Likewise, any number of people can attend a communication session such as a lecture or a presentation. Likewise, any number of people can listen to a radio broadcast or view a television broadcast. For simplicity, the present disclosure will hereinafter refer to any or all of the foregoing terms as a "communication session," regardless of the form of the communication session, the medium of the communication session, and what technology interconnects the people on the communication session. Thus, an audio conference is a communication session.

A communication session with many participants can pose difficulties. Advances in technology have made it possible for almost any number of people to participate in a communication session. However, participants can face barriers in being able to follow and understand the proceedings, or to actively take part.

One well-known way to better follow and understand what happened in any communication session is to record it for later consumption. For example, after the communication session is over and the recording of it is available, an employee can add to the recording a set of index notes or commentary to help a listener navigate the material. In another exemplary scenario, a student attending a lecture annotates a recording of the lecture in real-time by adding digital notes or photographs when the lecturer makes a point that is of interest to the student. When listening to the recording at a later time, the student can view the digital notes and photographs at the appropriate time, because they are time-aligned with the lecture. Additionally, the prior art includes electronic note-taking devices that capture a listener's notes during a lecture or meeting. These are useful note-taking tools.

Other well-known techniques in the art include instant messaging in which messages are exchanged in a medium that is distinct from the principal communication session. Likewise, Twitter™ enables participants to transmit comments to others, in a broadcast setting, while the principal communication session is taking place. Instant messaging and Twitter typically occur in parallel with the communication session, for example, during a presentation or trade show. In this way, commentary and review can reach a potentially wide audience.

The prior art also includes creating a transcript of a communication session. Some products offer searching of a recorded clip for a spoken word. Tagging on the World Wide Web is used for categorization or labeling of content, such as tagging a web site, or tagging a video clip. Tagging is useful for adding information "after-the-fact," i.e., after the content has been created. In sum, traditional approaches are directed at commentary or personal note-taking—approaches that fall outside the content-creation or content-communication scope of the principal communication session.

However, these techniques present disadvantages in business settings.

SUMMARY OF THE INVENTION

Businesses have different needs and priorities than traditional note-taking, tagging, or broadcast commentary that are available in the prior art. The inventors of the present invention recognized that a key distinction for a business communication session is the need to increase the communicative content of the proceedings through a live and collaborative approach that adds value to, but does not disrupt, the proceedings. Moreover, the inventors recognized that increasing the communicative content may mean modifying or directing the content itself to satisfy the purposes of the communication session. Of course, it will be clear to those having ordinary skill in the art, after reading the present disclosure, that the present invention is not limited to business settings.

In accordance with some illustrative embodiments of the present invention, participants on a communication session contribute tags—during the course of the communication session—such that the tags are visible as the communication session progresses to some, if not all, of the participants. This creates a "live" collaborative tagging environment. Moreover, the tags can be edited, rated, searched, browsed, and used during and after the communication session. The live collaborative environment not only enhances the communicative content of the communication session, but has the potential of changing the content of the communication session by giving speakers and listeners the opportunity to contribute and to use tags as they are created throughout the course of the communication session. This approach departs from traditional "after the fact" or "note-taking" techniques in the prior art.

For purposes of this disclosure, the noun "tag" is defined as a remark that is associated with all or part of a recording. For purposes of this disclosure, a "remark" comprises at least one word that is supplied by a person when tagging, though it will be clear to those having ordinary skill in the art, after reading the present disclosure, that a remark can comprise a medium other than words, such as audio, images, video, or other media, or a combination of media.

According to some illustrative embodiments of the present invention, the communication session is recorded. Tags are contributed by some or all the participants on the communication session. The tags are displayed as they are generated. Moreover, a person who declines to speak on the communication session can still actively contribute tags. In this way, a tagger can participate and contribute in a collaborative live manner while the communication session is in progress. Moreover, largely under the control of the user, the tags are associated with all or parts of the recording, which enhances the communicative content of the communication session. Thus, the live collaborative tagging takes on an interactive character that is consistent with the objectives of the communication session.

The tags, according to some illustrative embodiments of the present invention, can be associated in a variety of ways, including but not limited to: a tag that is associated with an instance in time of the recording of the communication session; a tag that is associated with the recording as a whole; a tag that is associated with a period of time of the recording, wherein the period of time is of a predetermined duration; a tag that is associated with a period of time of the recording, wherein the period of time is under the control of the person contributing the tag. The tags are searchable and browsable and can be edited and classified. In contrast to prior art that has no notion of association with a user-selected period of time, the present invention enables a user to exercise substantial control over the manner in which the user's remarks become associated with all or portions of the communication session.

During and after the communication session, the recording of the communication session, portions of the recording, the tags, and the associated information are available for subsequent use. A user can access the recording, the tags, and the associated portions of the recording. A user can add more tags. A user can also search, for example, by finding all tags contributed by a certain person. A user can also search, for example by tag type or by other classifications. Unlike the prior art, the present invention enables users (i) to tag "live," during the course of the communication session, (ii) by enabling both "producers" and "consumers" of the communication session to contribute tags, thus (iii) possibly resulting in a change of the content or communication being produced in the communication session. For example, a speaker may observe a newly-contributed tag and, as a result, provide additional information to the audience. For example, a speaker might say: "I see that someone had a question about my discussion of topic X—let me answer it." This is possible when remarks that seemed to ask a question were in tag that relates to the first ten minutes of the discussion of topic X—because the tag was associated with that portion of the conversation. In another example, a listener reading a tag realizes that there is confusion about the content and, as a result, asks a question to the speaker to clarify the subject matter, or edits an earlier tag. In this way, the collaborative nature of the interaction means that tags contributed earlier in the communication session may influence the tags that are contributed later—or the content of the communication session, or both.

For the purposes of this disclosure, different types of tag are defined herein. Generally, the tag type reflects a temporal aspect of the tag, as described in more detail below.

An "instant tag" is a tag that is associated with an instant of time in the recording. For example, an instant tag might be useful for flagging the start of a new topic.

An "offset time" is defined herein as an interval of time that sets an instant of time earlier than the actual time when the remark was submitted to the tagging system. The offset time accounts for the period of delay between the time a user hears something of interest and the time s/he submits the remark for the tag. For example, an offset time of five seconds might elapse before the user contributes an instant tag; consequently, with the offset time, the instant tag is associated with a point in time five seconds before the user actually submitted the remark.

A "deep tag" is a tag that is associated with a portion (or a segment) of the recording such that the duration of the tagged portion is under the control of the activating user. Like an instant tag, a deep tag can have an offset time. It will be clear to those having ordinary skill in the art, after reading the present disclosure, how to make and use alternative embodiments in which a deep tag is associated with a portion of the recording that has a predetermined duration based on the user's activation of the tag, for example, a fixed duration of one minute of the recording.

A "whole tag" is a tag that is associated with the entire recording of the communication session, regardless of the time when the whole tag is activated.

Some illustrative embodiments comprise a method comprising: generating by a data-processing system a first tag that comprises a first remark from a first user; transmitting by the data-processing system a first signal to display the first tag to (i) a first terminal that is associated with the first user and (ii) a second terminal that is associated with a second user, wherein a recording comprises the audio output of a communication session between the first user and the second user; and transmitting by the data-processing system a second signal to display a second tag to (i) the first terminal and (ii) the second terminal, wherein the second tag comprises a second remark from a party, wherein the party is at least one of the first user and the second user; wherein the generating and the transmitting operations: (i) occur during the course of the communication session; (ii) are independent of whether the first user speaks or listens on the communication session; and (iii) are independent of whether the second user speaks or listens on the communication session.

DETAILED DESCRIPTION

Figure 1:
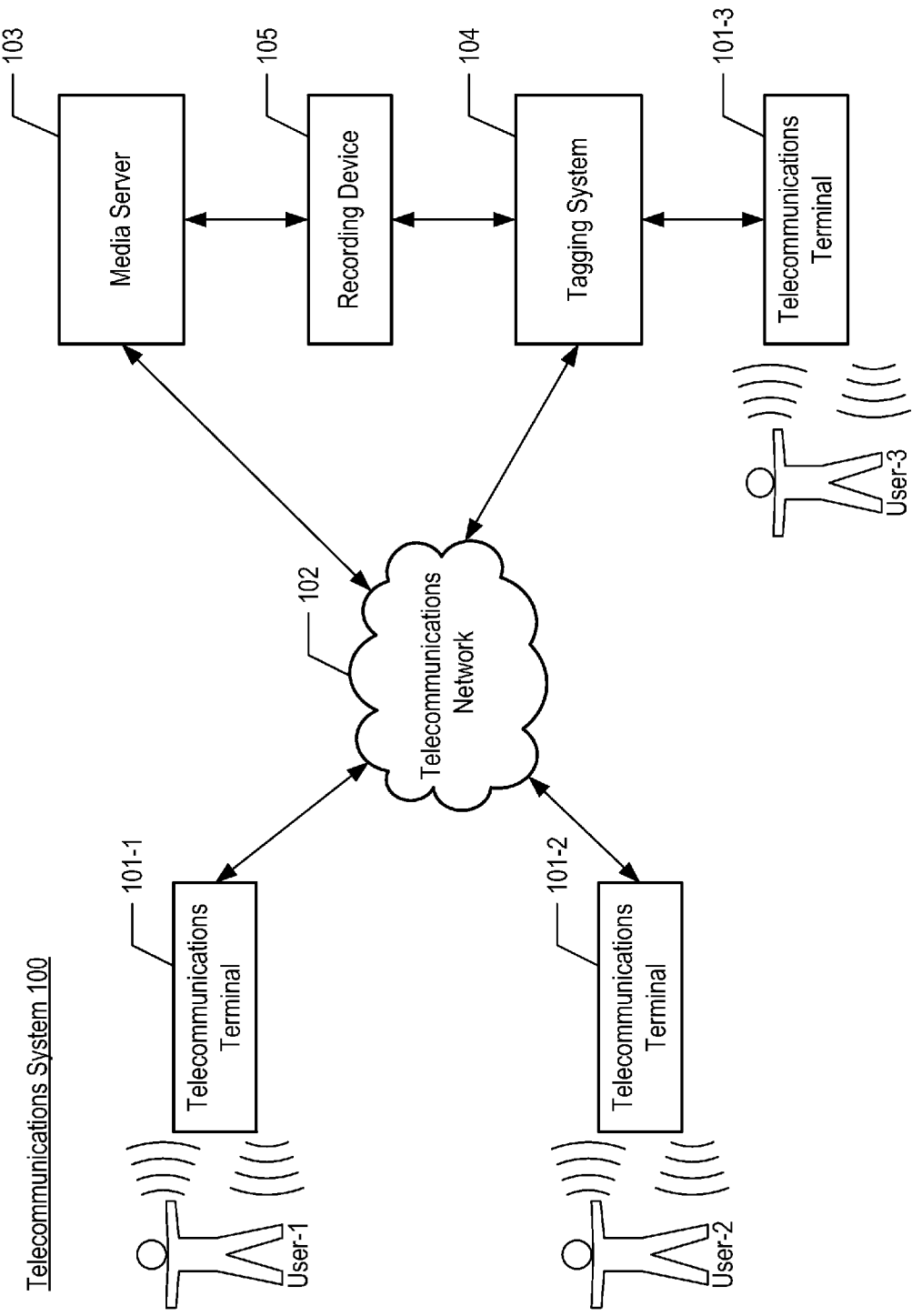
FIG. 1 depicts a schematic diagram of a portion of telecommunications system 100 according to an illustrative embodiment of the present invention.

FIG. 1 depicts a schematic diagram of a portion of telecommunications system 100 in accordance with an illustrative embodiment of the present invention. Telecommunications system 100 is an apparatus that comprises: telecommunications terminals 101-1, 101-2, and 101-3, telecommunications network 102, media server 103, tagging system 104, and recording device 105. FIG. 1 additionally depicts user-1, user-2, and user-3 positioned at telecommunications terminal 101-1, 101-2, and 101-3, respectively.

Although the illustrative embodiment comprises three telecommunications terminals 101-1, 101-2, and 101-3, it will be clear to those having ordinary skill in the art, after reading this disclosure, how to make and use alternative embodiments of the present invention that comprise any number of telecommunications terminals, e.g., two telecommunications terminals, four telecommunications terminals, five telecommunications terminals, etc.

Although the illustrative embodiment comprises one telecommunications network 102, it will be clear to those having ordinary skill in the art, after reading this disclosure, how to make and use alternative embodiments of the present invention that comprise any number of telecommunications networks, e.g., two telecommunications networks, three telecommunications networks, etc.

Although the illustrative embodiment comprises one media server 103, it will be clear to those having ordinary skill in the art, after reading this disclosure, how to make and use alternative embodiments of the present invention that comprise no media server or any number of media servers, e.g., two media servers, three media servers, etc. For example, a communication session among users who are together in the same room requires no media server.

Although the illustrative embodiment comprises one tagging system 104, it will be clear to those having ordinary skill in the art, after reading this disclosure, how to make and use alternative embodiments of the present invention that comprise any number of tagging systems, e.g., two tagging systems, three tagging systems, etc.

Although the illustrative embodiment comprises one recording device 105, it will be clear to those having ordinary skill in the art, after reading this disclosure, how to make an use alternative embodiments that comprise any number of recording devices, e.g., two recording devices, three recording devices, etc.

Although the illustrative embodiment comprises three users, i.e., user-1, user-2, and user-3, it will be clear to those having ordinary skill in the art, after reading this disclosure, how to make and use alternative embodiments of the present invention that support any number of users, e.g., four users, five users, etc.

Although the illustrative embodiment depicts the salient components of telecommunications system 100 connected as shown in FIG. 1, it will be clear to those having ordinary skill in the art, after reading this disclosure, that one or more of these components can be directly connected to one or more of the other components. For example, media server 103 can be directly connected to telecommunications terminal 101-1 or to tagging system 104.

Although the illustrative embodiment depicts the salient components of telecommunications system 100 connected as shown in FIG. 1, it will be clear to those having ordinary skill in the art, after reading this disclosure, that one or more of these components can be connected to one or more of the other components via one or more networks. Thus, for example, telecommunications terminal 101-3 can be connected to tagging system 104 via telecommunications network 102 or via another network. For example, media server 103 can be connected to tagging system 104 via telecommunications network 102 or via another network.

Although the illustrative embodiment depicts the salient components of telecommunications system 100 as being separate from one another, it will be clear to those having ordinary skill in the art, after reading the present disclosure, that a single physical device can comprise one or more of the depicted components. Thus, for example, a single physical device can comprise media server 103 and tagging system 104. Likewise, one of the components of telecommunications system 100 can comprise one or more of the other depicted components. For example, media server 103 can be subsumed into telecommunications network 102 by a "network bridge." For example, telecommunications terminal 101-1 can comprise media server 103 by acting as the "conference bridge" for a communication session. For example, tagging system 104 can comprise recording device 105. Likewise, media server 103 can comprise recording device 105.

Although the illustrative embodiment depicts every user of telecommunications system 100 as having the capability to both speak and listen on the communication session that is being tagged, it will be clear to those having ordinary skill in the art, after reading the present disclosure, that a user of tagging system 104 who is on the communication session that is being tagged need not speak and need not listen during the course of the communication session. It will be further clear to those having ordinary skill in the art, after reading the present disclosure, that a user of tagging system 104 need not have a connection to the communication session that would enable the user to speak on the communication session. In other words, user-n can listen to the communication session and still be actively tagging during the course of the communication session.

Telecommunications terminal 101-$n$ is well-known prior art hardware that is a personal computer and a two-way speakerphone that is coupled to the personal computer, wherein $n=1, 2,$ or $3$, such that telecommunications terminal 101-$n$ enables its user, during the course of the communication session, to speak on the communication session, listen on the communication session, and use tagging system 104, in any order or concurrently, without limitation. Thus, telecommunications terminal 101-$n$, in accordance with the illustrative embodiment, enables user-n to participate in the communication session that is being tagged and to concurrently use tagging system 104 during the course of the communication session.

It will be clear to those having ordinary skill in the art, after reading the present disclosure, how to make and use alternative embodiments of the present invention in which telecommunications terminal 101-$n$ can be any personal computer platform, a computer terminal, a soft-phone application running on a computer, a personal digital assistant, a Blackberry, an IPhone, etc.

It will be further clear to those having ordinary skill in the art, after reading the present disclosure, how to make and use alternative embodiments of the present invention in which a separate device enables a user to participate in the communication session, while telecommunications terminal 101-$n$ enables the use of tagging system 104 during the course of the communication session. For example, the separate device can be a wireline telephone or a wireless telephone for participating on the communication session, while telecommunications terminal 101-$n$ is a personal computer logged into tagging system 104. In other words, participating on the communication session that is being tagged and accessing tagging system 104 can be done by a user via separate devices.

Media server 103 is an apparatus well known in the prior art that supports a communication session among a plurality of users. It will be clear to those having ordinary skill in the art that a media server is sometimes known in the art as, or comprises, a "meet me bridge" or a "conference bridge" or a "multi-party bridge" or a "teleconferencing system" or a "conferencing system" or an "audio conference bridge" or a "video conferencing system" or other like terms. It will be clear to those having ordinary skill in the art, after reading the present disclosure, how to make and use alternative embodiments in which media server 103 supports a broadcast. It will be clear to those having ordinary skill in the art, after reading the present disclosure, how to make and use alternative embodiments in which another component of telecommunications system 100 comprises media server 103.

Tagging system 104 is a data-processing system, according to some illustrative embodiments of the present invention, whose capabilities are described below and in the accompanying figures.

Tagging system 104 receives, transmits, and processes information. Tagging system 104 enables a first plurality of users, in any order and with any frequency, without limitation, during the course of a communication session to engage in: tagging of the communication session; viewing the tags of communication session participants; viewing analyses associated with the tagging of the communication session; annotating existing tags; rating existing tags; deleting tags; editing the start and stop times of tags; etc. During and after the communication session, tagging system 104 enables a second plurality of users, in any order and with any frequency, without limitation to engage in: browsing, searching, retrieving, and listening to recording(s) or portions of recording(s) of a communication session that has been tagged by the second plurality of users or by other users; viewing the tags of communication session participants; viewing analyses associated with the tagging of the communication session; annotating existing tags; rating existing tags; deleting tags; editing the start and stop times of tags; etc. These and other capabilities of tagging system 104 are described in more detail below and in the accompanying figures.

It will be clear to those having ordinary skill in the art, after reading the present disclosure, how to make and use alternative embodiments in which some of the operations described herein in regards to tagging system 104 are performed by another component of telecommunications system 100. For example, a tag could be generated by telecommunications terminal 101-n and transmitted to tagging system 104.

Recording device 105 is an apparatus well-known in the prior art that records the proceedings of a communications session and produces a recording that is in a formal well-known in the art. It will be clear to those having ordinary skill in the art, after reading the present disclosure, how to make and use alternative embodiments that operate without a recording device 105 and without a recording of the entire communication session. Although in some illustrative embodiments the recording is an audio recording of the communication session, it will be clear to those having ordinary skill in the art, after reading the present disclosure, how to make and use alternative embodiments in which the recording is in another medium, such as a video recording. It will be further clear to those having ordinary skill in the art, after reading the present disclosure, how to make and use alternative embodiments in which the recording is a representation of the communication session, wherein the representation comprises meta-data such as a start time and an end time and other main events of the communication session, such that the recording retains its capacity to be associated in whole or in part with remarks to form tags.

A participant in a communication session is a user of tagging system 104 when s/he performs any of the foregoing activities with respect to tagging system 104. In addition, a user of tagging system 104 need not be a participant on a communication session to use tagging system 104. Gaining access, browsing, searching, retrieving, or listening to recording(s) on tagging system 104 are independent of whether the user is presently on, or previously participated in, a communication session. The set of participants on a communication session need not be identical to the set of users of tagging system 104. For example, a user can create tags during a communication session regardless of whether the user has the ability to speak on the communication session. For example, a user can listen to the communication session via a one-way streaming feed and all the while actively engage in tagging the communication session. For example, another user who did not participate in the communication session at all can later browse and search tags and listen to the associated portions of the recording of the communication session.

The details of telecommunications system 100 are further described below. It will be clear to those having ordinary skill in the art, after reading the present disclosure, how to make and use telecommunications system 100.

Figure 2:
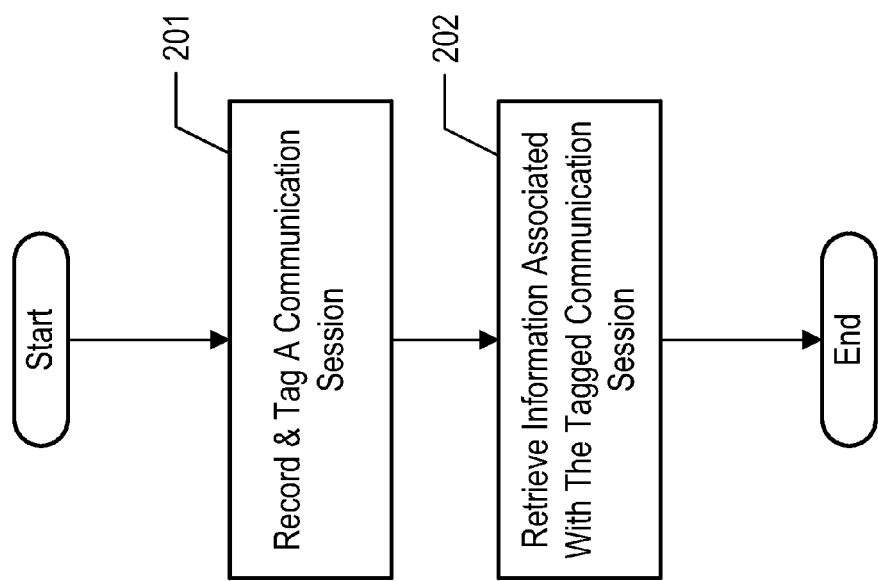
FIG. 2 depicts a flowchart of the salient steps of telecommunications system 100 according to an illustrative embodiment of the present invention.

FIG. 2 depicts a flowchart of the salient steps of telecommunications system 100 according to the illustrative embodiment of the present invention. Telecommunications system 100 comprises task 201 and task 202.

At task 201, a communication session is recorded and tagged. Task 201 is described in further detail below and in the accompanying figures.

At task 202, information associated with a tagged communication session is retrieved. Task 202 is described in further detail below and in the accompanying figures.

In the illustrative embodiment, task 202 occurs after a communication session has been completed, but it will be clear to those having ordinary skill in the art, after reading the present disclosure, how to make and use alternative embodiments in which task 202 occurs concurrently with the communication session. It will be further clear to those having ordinary skill in the art, after reading the present disclosure, how to make and use alternative embodiments in which task 202 occurs concurrently with the recording and tagging of another communication session.

Although the illustrative embodiment of telecommunications system 100 comprises only two tasks, it will be clear to those having ordinary skill in the art, after reading the present disclosure, how to make and use alternative embodiments of the present invention that has any number of tasks or sub-divisions of tasks, e.g., one task comprising both task 201 and task 202, two tasks that are differently sub-divided, three tasks, four tasks, etc. It will be further clear to those having ordinary skill in the art, after reading the present disclosure, how to make and use alternative embodiments of the present invention with multiple instances of either task 201 or task 202, or both. It will be further clear to those having ordinary skill in the art, after reading the present disclosure, how to make and use alternative embodiments of the present invention in which the constituent tasks of tasks 201 and 202 are organized differently, or are executed in a different sequence.

It will be clear to those having ordinary skill in the art, after reading the present disclosure, how to make and use task 201 and task 202 and their constituent tasks.

Figure 3:
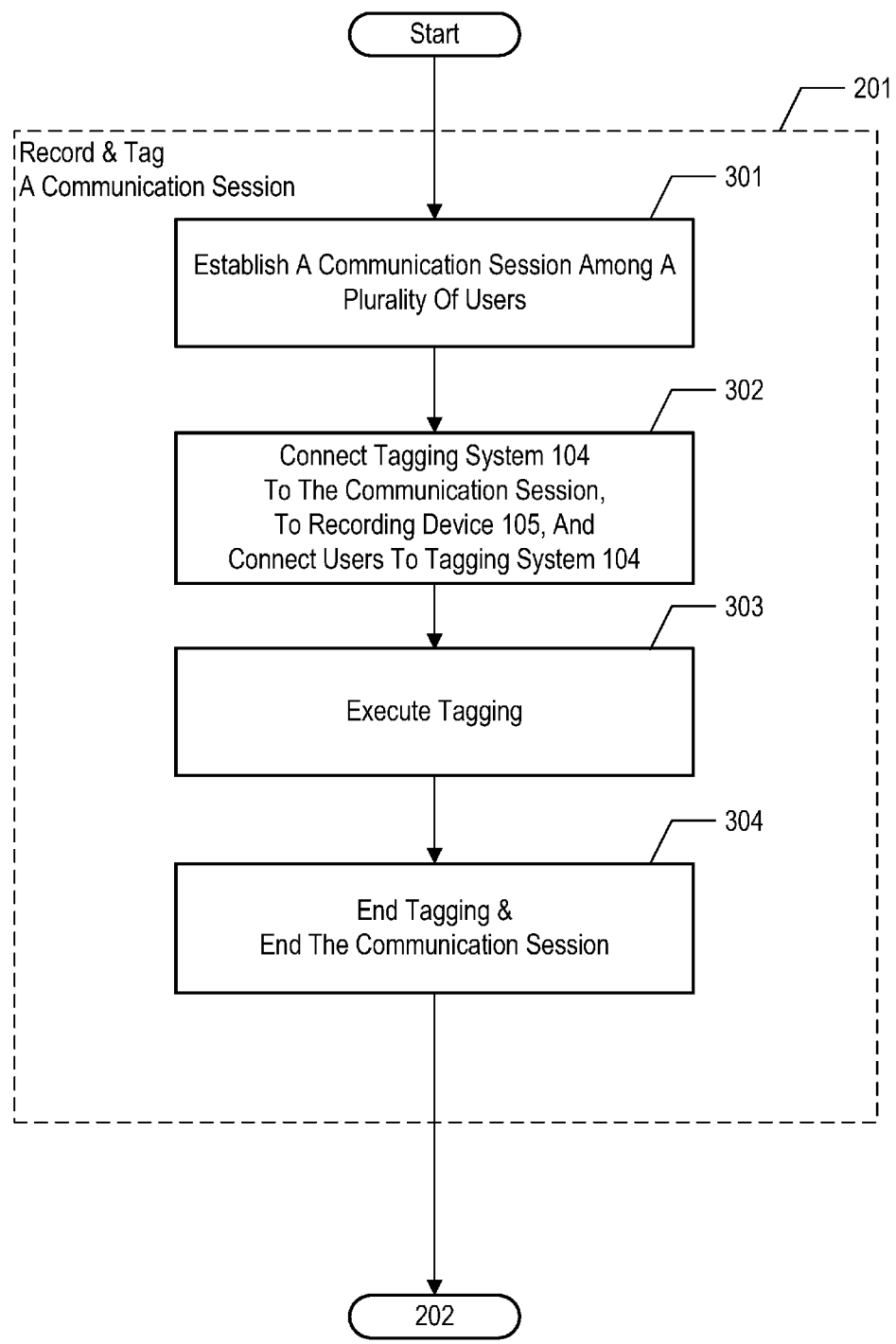
FIG. 3 depicts the salient tasks associated with the performance of task 201.

FIG. 3 depicts the salient tasks associated with the performance of task 201.

At task 301, a communication session is established among a number of users in a manner well-known in the art. In the illustrative embodiment three users, user-1, user-2, and user-3, join a conference call via media server 103. It will be clear to those having ordinary skill in the art, after reading the present disclosure, how to make and use alternative embodiments in which any number of users can participate in the communication session. It will be clear to those having ordinary skill in the art, after reading the present disclosure, how to make and use alternative embodiments in which the users are connected with each other in a different manner.

Although the communication session in the illustrative embodiment is an audio conference call, it will be clear to those having ordinary skill in the art, after reading the present disclosure, how to make and use alternative embodiments in which the communication session is a video communication session or comprises another medium.

At task 302, tagging system 104 connects to the communication session and to recording device 105 such that recording device 105 is capable of making a recording of the communication session. Although in the illustrative embodiment tagging system 104 connects to the communication session via media server 103, it will be clear to those having ordinary skill in the art, after reading the present disclosure, how to make and use alternative embodiments in which tagging system 104 connects to the communication session in a different way.

Although in the illustrative embodiment users log in to tagging system 104 via telecommunications terminal 101-$n$, it will be clear to those having ordinary skill in the art, after reading the present disclosure, how to make and use alternative embodiments in which participants who have joined the communication session are automatically given access to tagging system 104.

Although the illustrative embodiment comprises a scenario in which every communication session participant is also a user of tagging system 104 during the course of the communication session, it will be clear to those having ordinary skill in the art, after reading the present disclosure, how to make and use alternative embodiments in which the set of communication session participants and the set of users of tagging system 104 are not identical sets. However, in the preferred embodiment, every communication session participant has the capability of concurrently using tagging system 104.

At task 303, tagging-related operations occur during the course of the communication session. Task 303 is described in more detail below and in the accompanying figures.

At task 304, the tagging of the communication session and the communication session itself are brought to an end in a manner well-known in the art.

Figure 4:
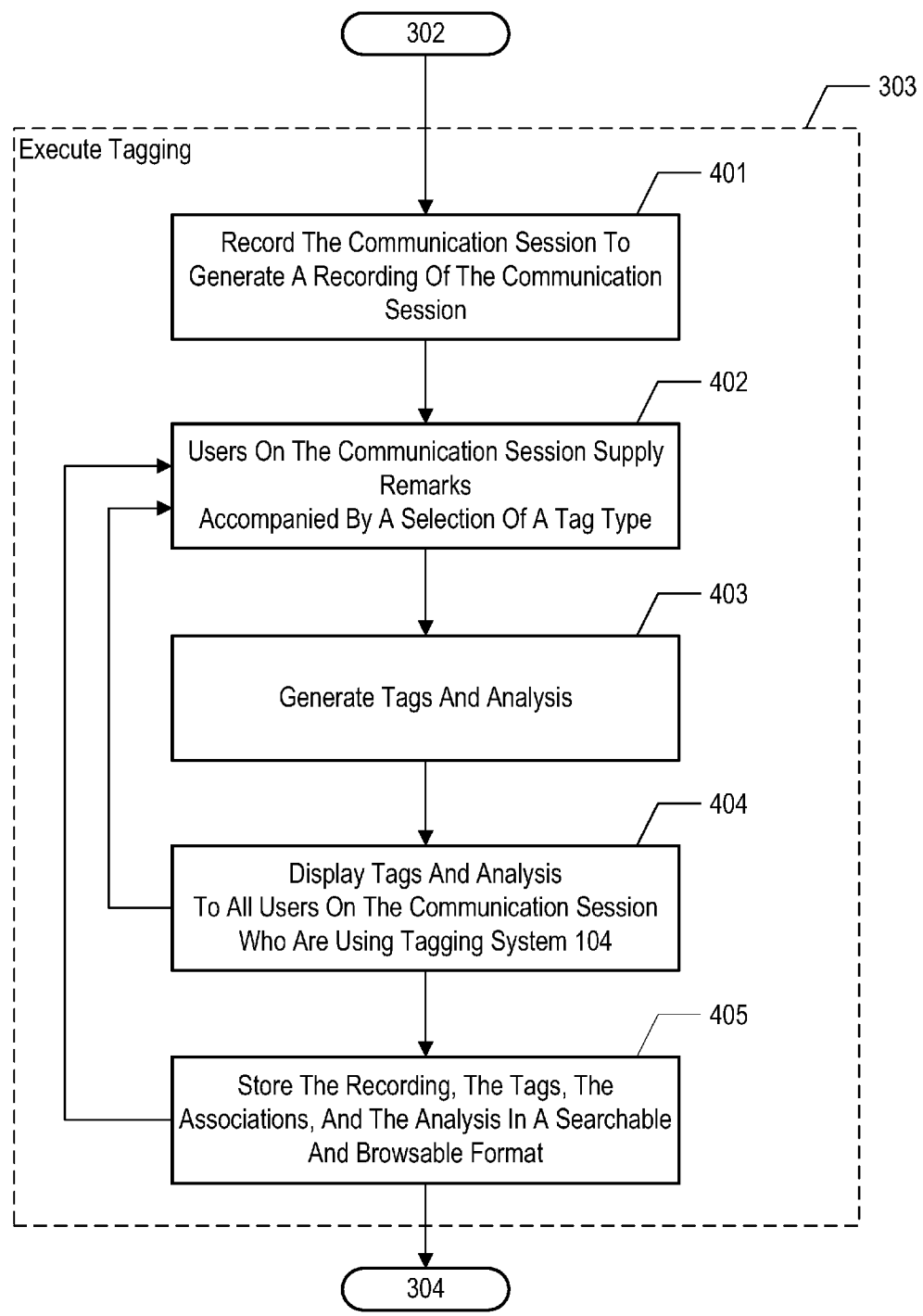
FIG. 4 depicts the salient tasks associated with the performance of task 303.

FIG. 4 depicts the salient tasks associated with the performance of task 303.

At task 401, recording device 105 records the communication session to generate a recording of the communication session in a format well-known in the art. Recording device 105 transmits the recording to tagging system 104 in a manner well-known in the art.

It will be clear to those having ordinary skill in the art, after reading the present disclosure, how to make and use alternative embodiments in which tagging system 104 is the system component that performs the recording operation. Likewise, in some alternative embodiments, media server 103 could make the recording and transmit it to tagging system 104.

Figure 4A:
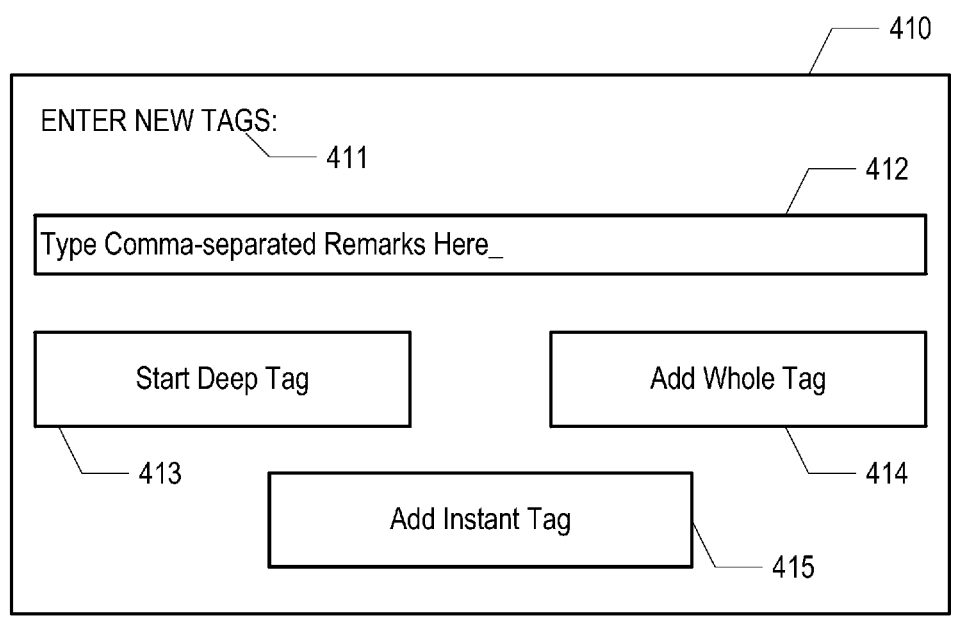
FIG. 4A depicts an illustrative embodiment of a display associated with the performance of task 402.
Figure 4B:
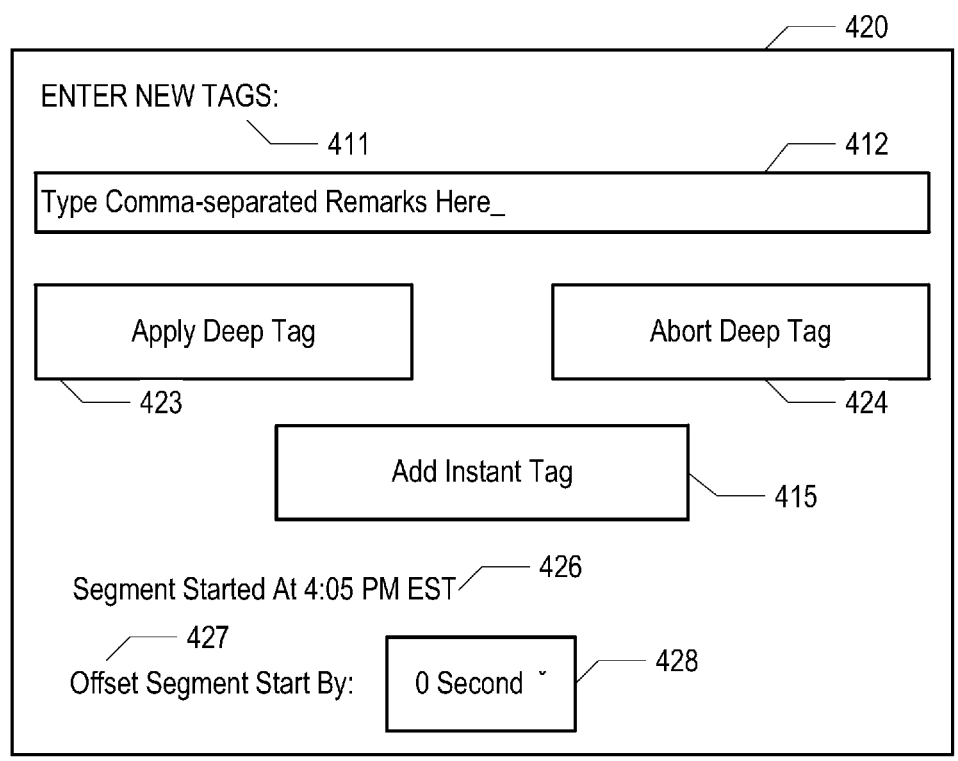
FIG. 4B depicts an illustrative embodiment of a display associated with the performance of task 402.

At task 402, once the communication session is in progress, tagging system 104 presents users with prompts for tagging the communication session via telecommunications terminal 101-$n$. A user selects a type of tag and supplies a remark to create a tag. FIGS. 4A and 4B, which are discussed in more detail below, provide illustrative embodiments of the prompts that are presented. For the purposes of this disclosure, three types of tag have been defined above. Additional aspects of the tags are described in more detail below and in the accompanying figures.

In the illustrative embodiment, an instant tag is created with a single click by pressing a screen "button," but it will be clear to those having ordinary skill in the art, after reading the present disclosure, how to make and use alternative embodiments in which an instant tag is created differently.

In the illustrative embodiment, a deep tag requires two clicks: a first click when the user's remark is submitted; and a second click that indicates completion of the deep tag. For example, when the user hears the speaker introduce the topic of "acquisition," the user submits the remark "acquisition" and clicks "start deep tag;" when the topic ends, the user clicks "apply deep tag" and the portion of the recording between the first click and the second click becomes associated with this deep tag. Like an instant tag, a deep tag can have an offset time that sets the start time of the deep tag to an earlier instant of time.

In some cases, after the deep tag was started, the user decides that the remarks supplied for the deep tag are not useful. Instead of clicking "apply deep tag" the user clicks "abort deep tag" which causes tagging system 104 to discard the information gathered so far and to scuttle the tag. No tag is created when the user clicks "abort deep tag." It will be clear to those having ordinary skill in the art, after reading the present disclosure, how to make and use alternative embodiments in which a deep tag is created or discarded differently.

It should be noted that instant tags can be added by a user after the user has started a deep tag but before clicking "apply deep tag." This creates a nesting effect. The deep tag retains the span of time between start and apply and the instant tags are independent of the deep tag's parameters. Furthermore, a user can start multiple deep tags, resulting in nested or overlapping deep tags.

It should be further noted that one user's deep tag is independent of another user's deep tag, such that the respective start and apply times can overlap without affecting each other.

In the illustrative embodiment, a whole tag is created with a single click by pressing a screen "button," but it will be clear to those having ordinary skill in the art, after reading the present disclosure, how to make and use alternative embodiments in which a whole tag is created differently. Because it is associated with the entire recording of the communication session, regardless of the time of activation, a whole tag might be useful for tagging the speakers on a communication session without regard to when they speak.

It should be noted that whole tags can be added by a user after the user has started a deep tag but before clicking "apply deep tag." The deep tag retains the span of time between start and apply independently of the timing of the whole tags.

Although the illustrative embodiments create associations between a tag and all or parts of the recording, it will be clear to those having ordinary skill in the art, after reading the present disclosure, how to make an use alternative embodiments in which the tags themselves or tag pointers become embedded into a data structure that comprises both the recording and the tags.

At task 403, tags and analysis pertaining to the tagging of the communication session are generated. In the illustrative embodiment, tagging system 104 generates the tags and the analysis. It will be clear to those having ordinary skill in the art, after reading the present disclosure, how to make and use alternative embodiments in which the tag is generated elsewhere in telecommunications system 100 and transmitted to tagging system 104. It will be further clear to those having ordinary skill in the art, after reading the present disclosure, how to make and use alternative embodiments in which the analysis is generated in whole or in part in another component of telecommunications system 100 and transmitted to tagging system 104.

Task 403 is described in more detail below and in the accompanying figures.

Figure 7A:
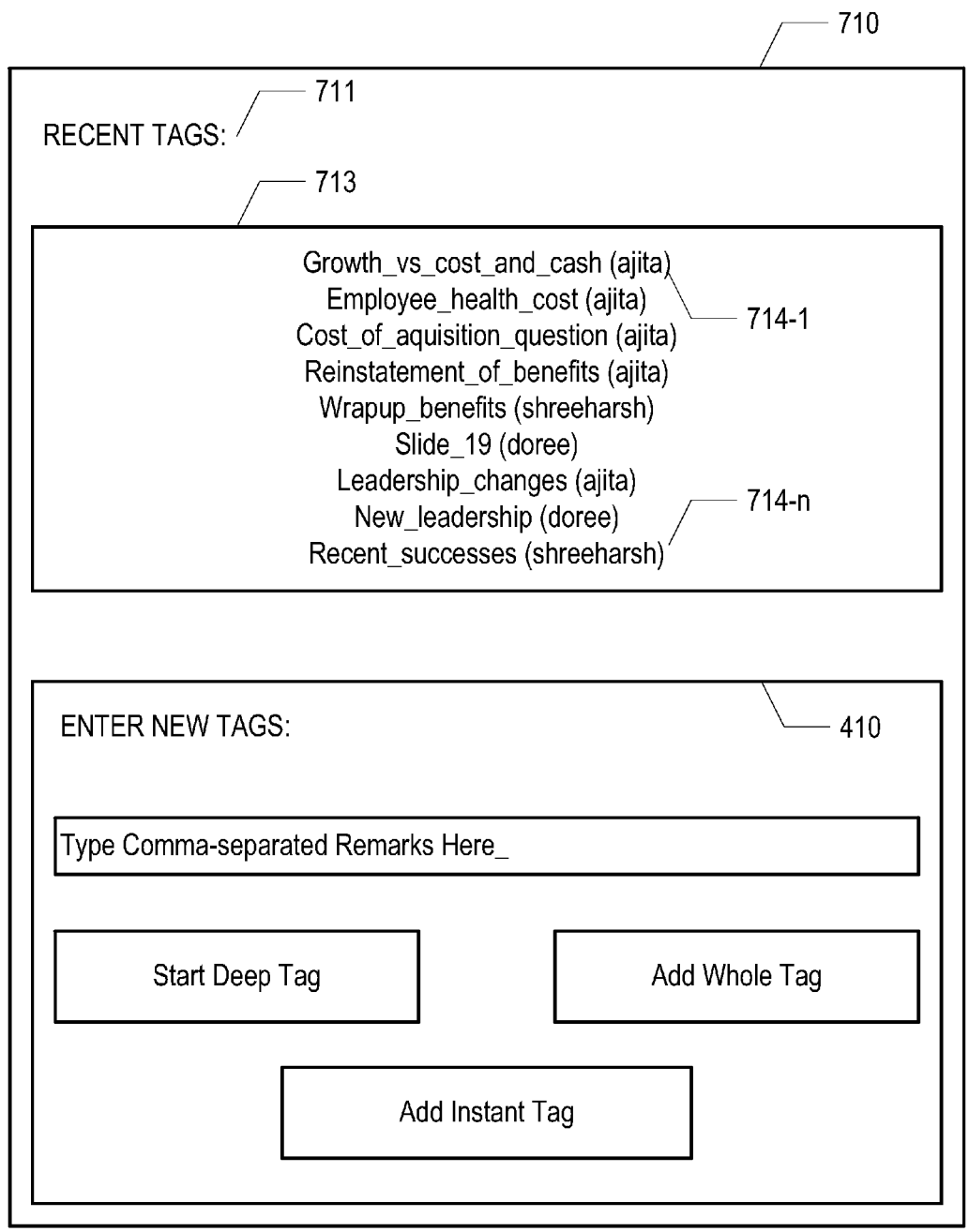
FIG. 7A depicts a first illustrative embodiment of a display associated with the performance of task 404.
Figure 7B:
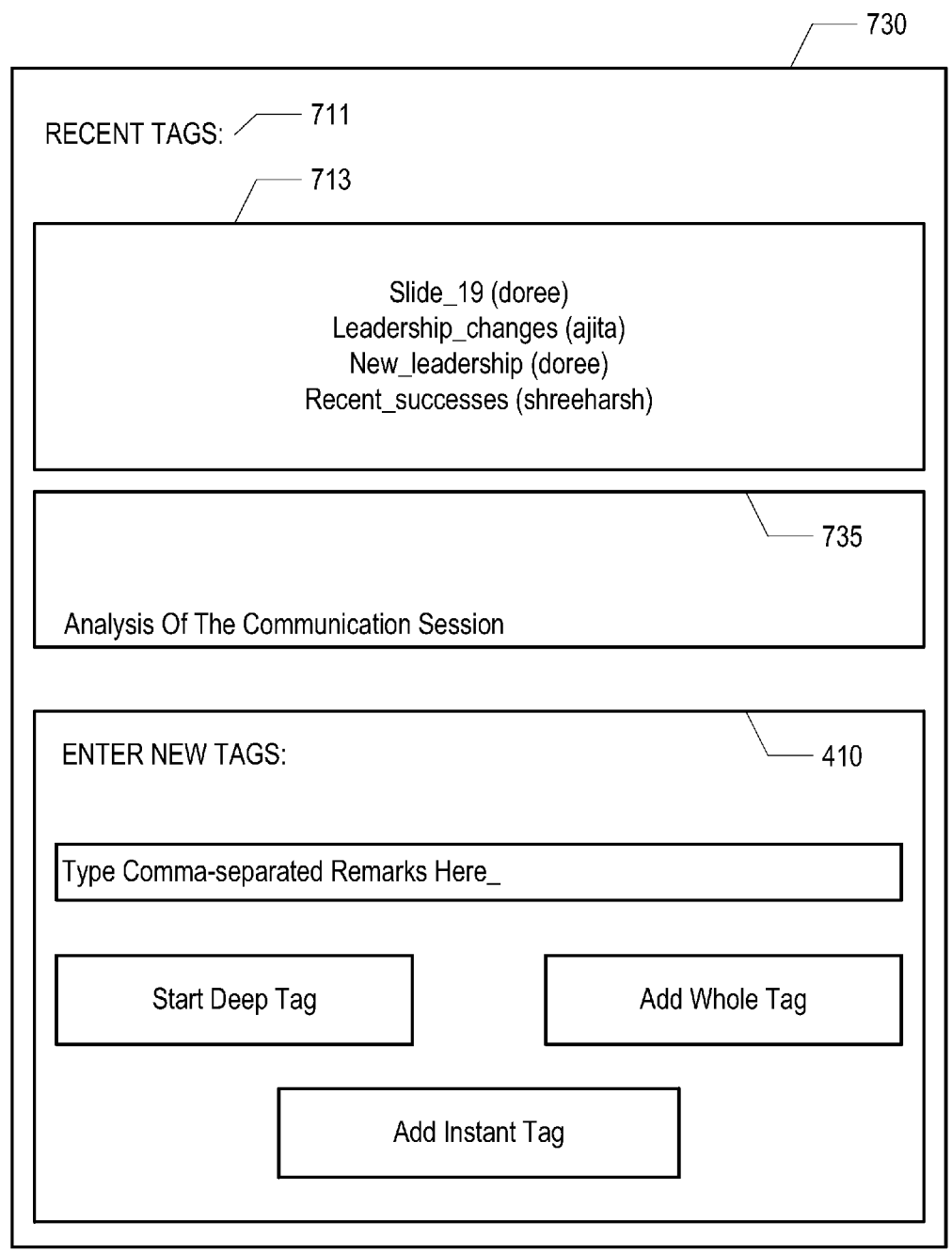
FIG. 7B depicts a second illustrative embodiment of a display associated with the performance of task 404.

At task 404, throughout the course of the communication session, tagging system 104 enables all its users to view (i) the tags that are being generated on the communication session and (ii) relevant analysis. FIGS. 7A and 7B, which are discussed in more detail below, provide illustrative embodiments of the displays that are presented to users in the course of the communication session, while tagging of the communication session is on-going.

It will be clear to those having ordinary skill in the art, after reading the present disclosure, how to make and use alternative embodiments in which a user can restrict the visibility of a tag by marking it private, so that others cannot concurrently or subsequently view the tag. The implementation of a private/public visibility scheme, or some other more granular approach to tag privacy, is at the discretion of the implementers of a system in accordance with the present invention.

At task 405, tagging system 104 stores the recording of the communication session, the tags that were generated, the data associated with the tags, and all or part of the analysis—in a searchable and browsable format for subsequent retrieval. It will be clear to those having ordinary skill in the art, after reading the present disclosure, how to make and use alternative embodiments in which tagging system 104 does not store this information, and instead transmits it to another component of telecommunications system 100 for storage.

FIG. 4A depicts an illustrative embodiment of a display associated with the performance of task 402 as shown in block 410.

Label 411 prompts a user of tagging system 104 to enter a new tag.

Block 412 is where a user enters a remark for the tag. A user's remark may comprise any number of words. After entering the remark, the user selects one of the available types of tag, as explained next.

Screen "button" 413 is for starting a deep tag.
Screen "button" 414 is for adding a whole tag.
Screen "button" 415 is for adding an instant tag.

It will be clear to those having ordinary skill in the art, after reading the present disclosure, that FIG. 4A provides an illustration only and that alternative embodiments will be differently arranged, activated, or labeled. It will be further clear to those having ordinary skill in the art, after reading the present disclosure, how to make and use alternative embodiments that comprise privacy settings or other settings for tags.

FIG. 4B depicts an illustrative embodiment of a display associated with the performance of task 402 as shown in block 420. This display appears after the user has started a deep tag with the "start deep tag" selection in block 410. The user is presented with the tag's timestamp at 426. The user is also presented with an optional offset time 427 that can be increased from zero via drop-down menu 428.

The user who is presented with block 420 may enter in block 412 an additional remark for the deep tag in progress. The user completes the deep tag in progress by selecting screen button 423, i.e., "apply deep tag." The user discards the deep tag in progress by selecting screen button 424, i.e., "abort deep tag." The user adds an instant tag by selecting screen button 415.

It will be clear to those having ordinary skill in the art, after reading the present disclosure, that FIG. 4B provides an illustration only and that alternative embodiments will be differently arranged, activated, or labeled. It will be further clear to those having ordinary skill in the art, after reading the present disclosure, how to make and use alternative embodiments that comprise privacy settings or other settings for tags.

As noted, FIGS. 4A and 4B present illustrative displays that one having ordinary skill in the art can re-arrange into other configurations best suited to the purposes of the implementers of the system in accordance with the present invention.

Figure 5:
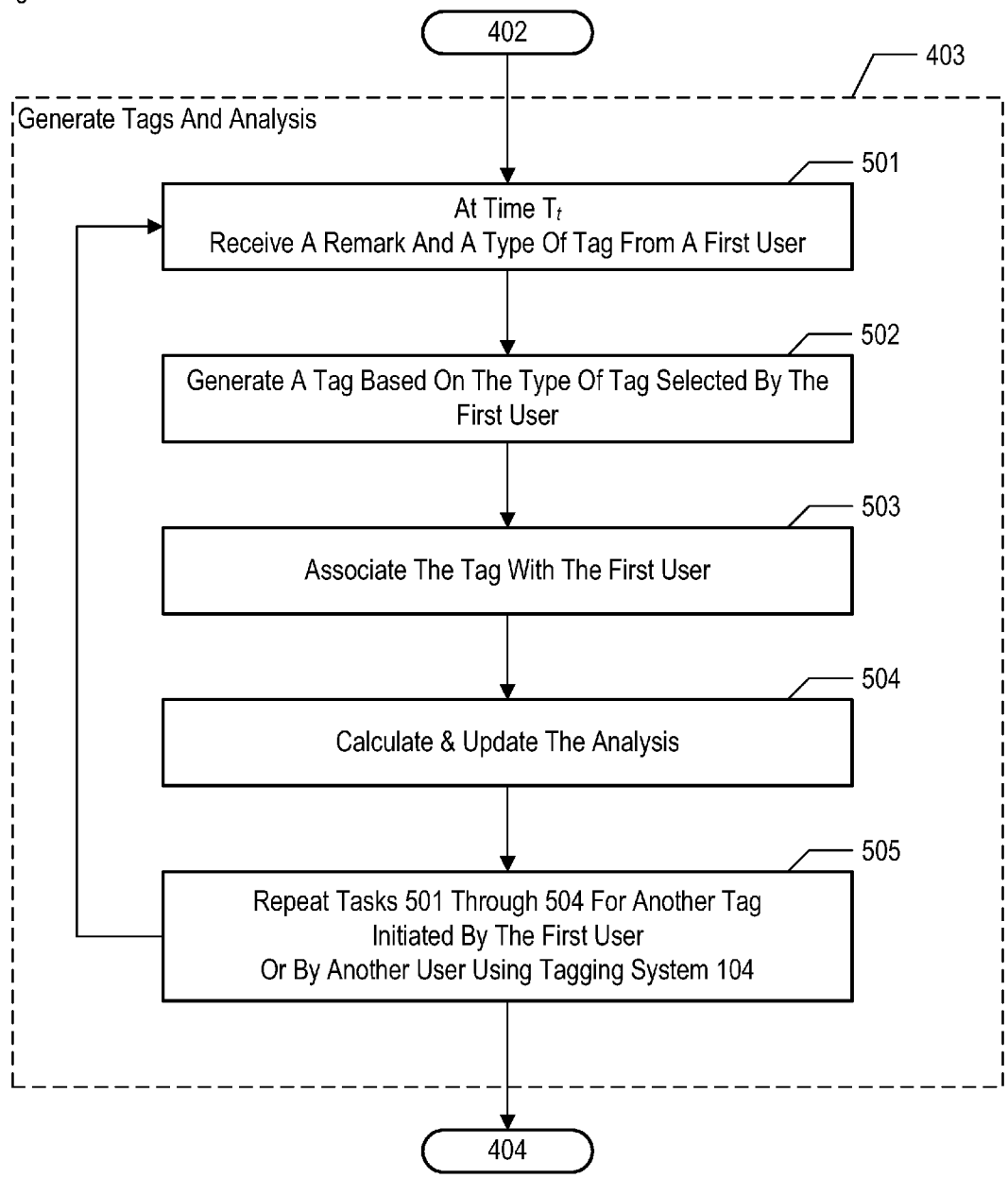
FIG. 5 depicts the salient tasks associated with the performance of task 403.

FIG. 5 depicts the salient tasks associated with the performance of task 403.

At task 501, tagging system 104 receives from a first user at time $T_t$ a remark that is accompanied by a type of tag. As illustrated in FIG. 4A, a first user can select an instant tag or a whole tag, or can start a deep tag.

At task 502, tagging system 104 generates a tag based on the type of tag selected by the first user. Task 502 is described in more detail below and in the accompanying figures.

At task 503, tagging system 104 associates the tag generated in task 502 with the identity of the first user, i.e., with the user who supplied the remark to create the tag. This association can be subsequently exploited for analysis, and for browsing and searching, and possibly for classification of tags.

At task 504, tagging system 104 calculates and updates the analysis that arises out of the on-going tagging activity on the communication session. For example, as shown in the illustrative display of FIG. 7B, tagging system 104 presents an analysis block of the communication session that provides analytical information about the communication session.

It should be noted that in the illustrative embodiment the information that the analysis comprises is based on the tagging activity of the communication session in progress, but it will be clear to those having ordinary skill in the art, after reading the present disclosure, how to make and use alternative embodiments in which the analysis comprises information about other communication sessions, or other information of the implementers' choosing, such as images of the speakers, etc.

At task 505, foregoing tasks 501 through 504 repeat for another tag, which is initiated during the course of the communication session by the same first user, or by another user, via tagging system 104. Moreover, it will be clear to those having ordinary skill in the art, after reading the present disclosure, that the tasks illustrated in the present figure support the generation of any number of tags, concurrently or sequentially, from one or more users of tagging system 104 during the course of the communication session, without limitation.

It should be noted that substantially concurrently with the foregoing tasks in the present figure, task 404 displays tags and analysis to at least some of the users of tagging system 104 throughout the course of the communication session.

Figure 6:
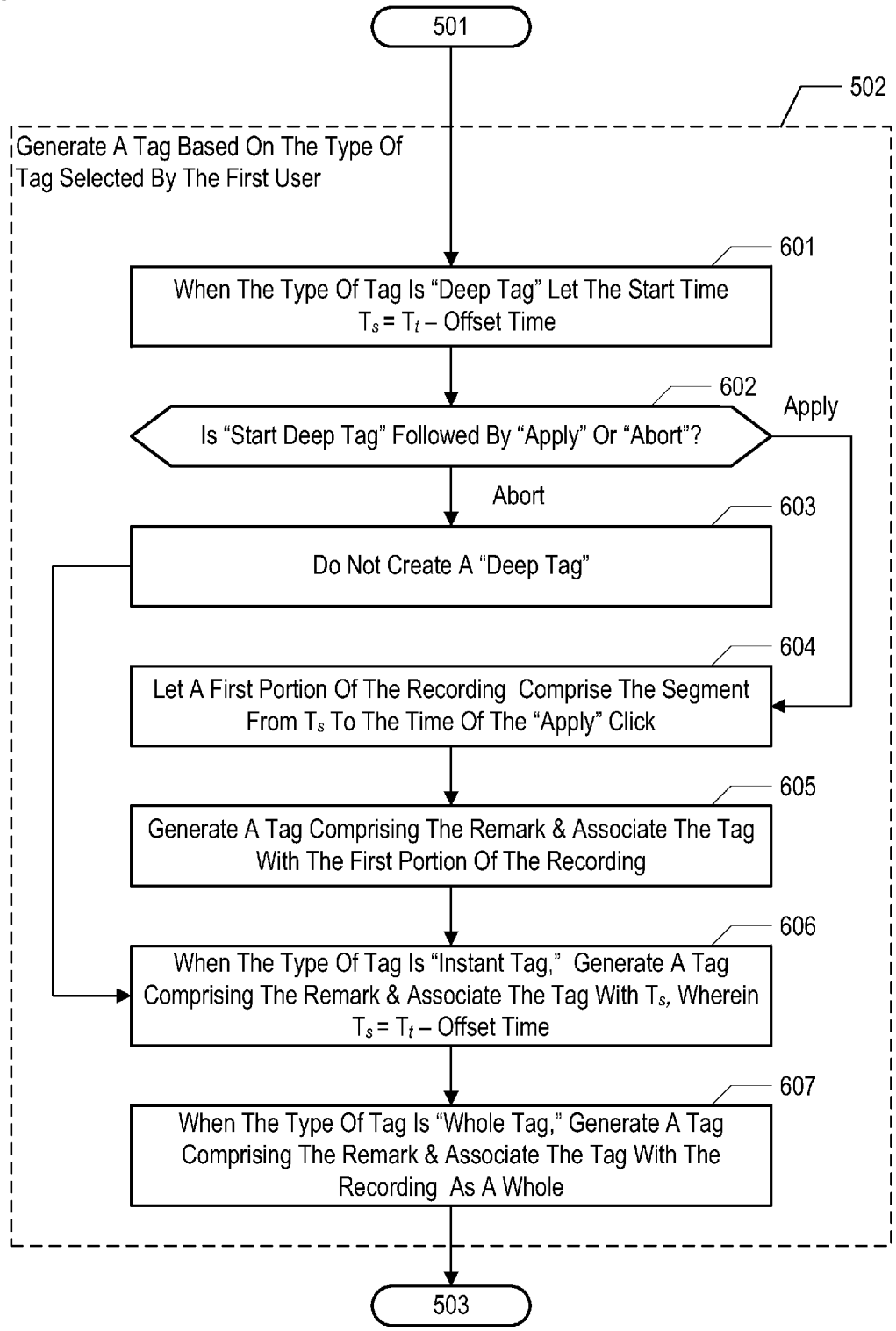
FIG. 6 depicts the salient tasks associated with the performance of task 502.

FIG. 6 depicts the salient tasks associated with the performance of task 502.

At task 601, when the user of tagging system 104 selects "add deep tag," meaning that the type of tag the user wishes to contribute is a deep tag, tagging system 104 sets the start time of the deep tag T. Thus, $T_s$ is the time that the user made the selection $T_t$ minus an offset time, if any. For example, if a user selects "add deep tag" at 11:05:22 a.m. and the offset time is ten seconds, tagging system 104 sets the start time of the deep tag $T_s$ to be 11:05:12 a.m. In the illustrative embodiment, the offset time has a value that the user can set via a pull-down menu, as shown in FIG. 4B. It will be clear to those having ordinary skill in the art, after reading the present disclosure, how to make and use alternative embodiments in which the offset time has a fixed system-wide value or is not used at all.

Task 602 is a decision point that depends on whether "add deep tag" is followed by an "apply" or by an "abort" selection by the user. When the user selects "apply deep tag" control passes to task 604. When the user selects "abort deep tag" control passes to task 603.

At task 603, a deep tag that was started is followed by an "abort deep tag" selection. Accordingly, tagging system 104 discards the information gathered so far in regards to the present deep tag and does not generate the deep tag.

At task 604, a deep tag that was started is followed by an "apply deep tag" selection. Accordingly, tagging system 104 defines a first portion of the recording wherein the first portion begins at time $T_s$ and ends when "apply deep tag" is selected.

At task 605, tagging system 104 generates a tag. The tag comprises the remark supplied by the user and is associated with the first portion of the recording. It will be clear to those having ordinary skill in the art, after reading the present disclosure, how to make and use alternative embodiments in which a deep tag is associated with a portion of the recording wherein the portion begins at time $T_s$ and ends after a predetermined interval of time.

At task 606, when the user of tagging system 104 selects "add instant tag," meaning that the type of tag the user wishes to contribute is an instant tag, tagging system 104 sets the start time of the instant tag $T_s$ in the manner described for task 601. Tagging system 104 generates a tag. The tag comprises the remark supplied by the user and is associated with time $T_s$.

At task 607, when the user of tagging system 104 selects "add whole tag," meaning that the type of tag the user wishes to create is a whole tag, tagging system 104 generates a tag. The tag comprises the remark supplied by the user and is associated with the recording as a whole.

FIG. 7A depicts a first illustrative embodiment of a display associated with the performance of task 404.

As noted, the methods of live collaborative tagging described herein enable displaying to the participants on a communication session the tags that are being contributed throughout the course of the communication session. The participants can add more tags or perform other operations. The display is illustrated in block 710.

Label 711 indicates that recent tags are displayed below.

Block 713 comprises a list of recently generated tags, 714-1 through 714-n. Block 713 is sometimes referred to herein as the "tag cloud." It should be noted that the illustrative tag cloud comprises a plurality of tags, some of which were contributed by the same user. The tags in the illustrative tag cloud are displayed as they are generated, but it will be clear to those having ordinary skill in the art, after reading the present disclosure, how to make and use alternative embodiments in which the tag cloud presents the tags differently.

Tag 714-n is an example of a tag generated during the course of a communication session. The tag comprises the remark supplied by the user whose identity appears in parentheses. For example, Ajita's remark "Growth vs cost and cash" is illustrated in tag 714-1. The underscore marks are illustrative only. In some illustrative embodiments, the size of the tag is depicted proportionally to the number of times the tag has been created (with the same or similar remarks) and the number of users is appended to the tag; when only one user has contributed the tag, the user's identity appears in parentheses. In some illustrative embodiments, tags are color-coded according to the identity of the user who contributed the tag. In some illustrative embodiments, the size of a tag correlates to the ratings it has received.

It will be clear to those having ordinary skill in the art, after reading the present disclosure, how to make and use alternative embodiments in which the recently generated tags are presented in a different format. It will be further clear to those having ordinary skill in the art, after reading the present disclosure, how to make and use alternative embodiments in which a different number of recently generated tags is presented; or in which the identity of a tag's creator is differently presented or is obscured; or in which additional information is presented when a user selects or scrolls over a tag in the tag cloud.

Block 410 is identical to the one illustrated in FIG. 4A, but it will be clear to those having ordinary skill in the art, after reading the present disclosure, how to make and use alternative embodiments in which users of tagging system 104 are presented with the prompts for creating new tags in a different format than illustrated here.

FIG. 7B depicts a second illustrative embodiment of a display associated with the performance of task 404.

As noted, the methods of live collaborative tagging described herein enable displaying to the participants on a communication session the tags that are being created throughout the course of the communication session. The participants can add more tags or perform other operations. This is illustrated in block 730.

Items 711, 713, and 410 are identical to those illustrated in FIG. 7A, but it will be clear to those having ordinary skill in the art, after reading the present disclosure, how to make and use alternative embodiments in which users of tagging system 104 are presented with a different format than the one illustrated here, while retaining the ability to view, edit, and create tags during the course of the communication session.

Block 735 illustrates an embodiment of how an analysis arising from the tagging of the communication session is presented to users during the course of the communication session. Block 735 represents an analysis block comprising analytical information about the communication session.

It will be clear to those having ordinary skill in the art, after reading the present disclosure, how to make and use alternative embodiments in which analytical information is differently formatted; in which other information about the communication session and about the tags is presented in block 735; in which information about the communication session and about the tags is presented differently in relation to the information in blocks 713 and 410. It will be clear to those having ordinary skill in the art, after reading the present disclosure, that the manner of presenting the tags and the analysis is largely up to the implementers of a system in accordance with the present invention. As noted, FIGS. 7A and 7B present illustrative displays that one having ordinary skill in the art can re-arrange into other configurations.

Figure 8:
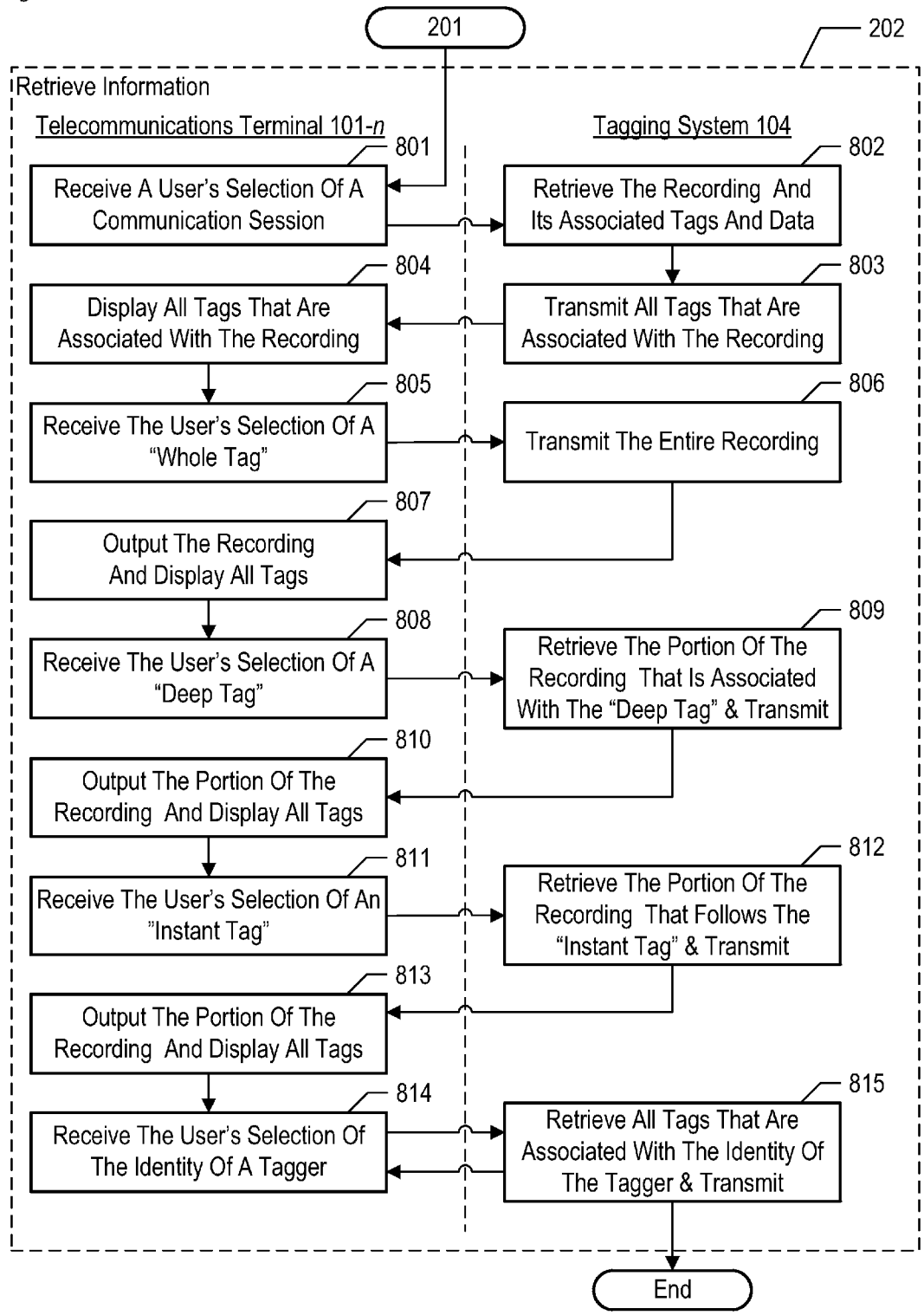
FIG. 8 depicts the salient tasks associated with the performance of task 202.

FIG. 8 depicts the salient tasks associated with the performance of task 202. FIG. 8 depicts operations that occur at tagging system 104 and at telecommunications terminal 101-n, wherein n=1, 2, or 3, in accordance with some illustrative embodiments. As noted, telecommunications terminal 101-n need not have participated in the communication session in order to perform task 202.

At task 801, telecommunications terminal 101-n receives a user's selection of a communication session from among the communication sessions that are available from tagging system 104. Tagging system 104 can store and retrieve information about any number of communication sessions.

At task 802, in response to the user's selection, tagging system 104 retrieves the recording of the communication session and the tags that are associated with the communication session and other data that is associated with the communication session. An example of other data is an analysis of the communication session, analogous to the information displayed in block 735.

At task 803, tagging system 104 transmits to telecommunications terminal 101-*n* the plurality of tags that are associated with the communication session.

At task 804, telecommunications terminal 101-*n* displays to the user the plurality of tags.

At task 805, telecommunications terminal 101-*n* receives the user's selection of a whole tag from among the plurality of tags.

At task 806, in response to the user's selection of a whole tag, tagging system 104 transmits the entire recording to telecommunications terminal 101-*n*, because a whole tag is associated with the recording as a whole.

At task 807, telecommunications terminal 101-*n* outputs to the user the entire recording and displays the plurality of tags to enable the user to make a further selection.

At task 808, telecommunications terminal 101-*n* receives a user's selection of another tag—a deep tag—from among the plurality of tags.

At task 809, in response to the user's selection of a deep tag, tagging system 104 retrieves the portion of the recording that is associated with the selected deep tag and transmits it to telecommunications terminal 101-*n*.

At task 810, telecommunications terminal 101-*n* outputs to the user the portion of the recording that is associated with the selected deep tag, and displays the plurality of tags to enable a further selection by the user.

At task 811, telecommunications terminal 101-*n* receives the user's selection of another tag—an instant tag—from among the plurality of tags.

At task 812, in response to the user's selection of an instant tag, tagging system 104 retrieves the portion of the recording that follows the start time of the instant tag and transmits it to telecommunications terminal 101-*n*.

At task 813, telecommunications terminal 101-*n* outputs to the user the portion of the recording and displays the plurality of tags to enable a further selection by the user.

At task 814, telecommunications terminal 101-*n* receives the user's selection of the identity of a so-called "tagger," a user who contributed at least one tag. The tagger's identity might be the user's own or someone else's. For example, a user might want to view all the tags s/he contributed. For example, a user might want to view all the tags contributed by the person who convened the communication session.

Although the illustrative embodiment shows a search based on an identity, it will be clear to those having ordinary skill in the art, after reading the present disclosure, how to make and use alternative embodiments where the user searches based on other criteria, such as tag topic, tag timing, type of tag, duration of tag, tag synonyms, etc. The choice and extent of search criteria to be offered to a user at task 814, and more generally at task 202, is up to the implementers of a system in accordance with the present invention.

At task, 815, in response to the user's selection of the identity of a tagger, tagging system 104 retrieves all tags in the plurality of tags that are associated with the identity of the tagger and transmits them to telecommunications terminal 101-*n*. Although not shown in FIG. 8, telecommunications terminal 101-*n*, at task 814, outputs the information received from tagging system 104 and enables a further selection by the user.

Although it is not illustrated in FIG. 8, it will be clear to those having ordinary skill in the art, after reading the present disclosure, that the searching and browsing process of task 202 and its constituent tasks continues at the discretion of the user, based on the presently selected communication session, or based on another communication session available from tagging system 104, in any order of the user's choosing, without limitation.

It is to be understood that the disclosure teaches just some examples of illustrative embodiments and that many variations of the present invention can easily be devised by those skilled in the art after reading this disclosure, and that the scope of the present invention is to be determined by the following claims.

What is claimed is:

1. A method comprising:
    generating, via a processor, a first tag comprising a first remark from a first user, wherein the first tag is associated with a communication session between the first user and a second user, and wherein the first tag is generated during the communication session;
    transmitting a first signal to a first terminal associated with the first user and a second terminal associated with the second user, wherein the first signal instructs the first terminal and the second terminal to display the first tag during the communication session;
    transmitting a second signal to the first terminal and the second terminal, wherein the second signal instructs the first terminal and the second terminal to display a second tag during the course of the communication session, and wherein the second tag comprises a second remark associated with the communication session and at least one of the first user and the second user;
    generating, during the communication session, a first association between the first tag and a first identity associated with the first user, and a second association between the second tag and a second identity associated with at least one of the first user and the second user; and
    transmitting, during the communication session, the first identity and the second identity for display at the first terminal and the second terminal.

2. The method of claim 1, wherein the first tag is associated with a time in the recording, wherein the time is selected by the first user.

3. The method of claim 1, wherein the first tag is associated with a first portion of a recording of the communication session, wherein a start time of the first portion of the recording is selected by the first user, and wherein a duration of the first portion of the recording is predetermined.

4. The method of claim 1, wherein the first tag is associated with a first portion of a recording of the communication session, wherein a start time of the first portion of the recording is selected by the first user, and wherein an end time of the first portion of the recording is selected by the first user.

5. The method of claim 4, wherein the second tag is associated with a second portion of the recording, wherein a second start time of the second portion of the recording is selected by the second user, wherein a second end time of the second portion of the recording is selected by the second user, and wherein the first portion of the recording overlaps at least some of the second portion of the recording.

6. The method of claim 1, wherein the first tag is associated with an entire recording of the communication session.

7. The method of claim 1, further comprising:
    in response to a third signal that is based on the first tag, transmitting, during the communication session, a first portion of a recording of the communication session to at least one of the first terminal, the second terminal and a third terminal, wherein the first portion of the recording is associated with the first tag.

8. The method of claim 1, further comprising:
in response to a third signal that is based on an identity of the first user, retrieving all tags that are associated with the identity of the first user, wherein the first tag is associated with the identity of the first user, and wherein the third signal is received from at least one of the first terminal, the second terminal, and a third terminal.

9. The method of claim 1, further comprising:
generating, during the communication session, an analysis of a plurality of tags, wherein the plurality of tags comprises the first tag and the second tag; and
transmitting during the communication session a third signal to the first terminal and the second terminal, wherein the third signal instructs the first terminal and the second terminal to display at least a portion of the analysis.

10. A method comprising:
receiving, from a first terminal, a first signal associated with a start time of a first portion of a recording, and a second signal comprising a first remark from a first user, wherein the recording comprises audio output of a communication session between the first user and a second user;
generating a first tag based on the first signal and the second signal, wherein the first tag is associated with the first portion of the recording and comprises the first remark from the first user; and
transmitting, via a processor, a third signal instructing the first terminal and a second terminal associated with the second user to display the first tag during the communication session;
generating, during the communication session, a second tag associated with a second portion of the recording, the second tag comprising a second remark from at least one of the first user and the second user; and
transmitting, during the communication session, a fourth signal to the first terminal and the second terminal, wherein the fourth signal instructs the first terminal and the second terminal to display the second tag.

11. The method of claim 10 wherein the first portion of the recording overlaps with at least some of the second portion of the recording.

12. The method of claim 10 wherein the first tag is generated by the first terminal.

13. The method of claim 10 wherein the first tag is generated by the processor.

14. The method of claim 10, wherein an end time for the first portion of the recording is selected by the first user.

15. The method of claim 14, wherein at least one of the start time, the end time, and a duration of the first portion of the recording is edited by at least one of the first user, the second user, and a third user.

16. The method of claim 10, wherein the first portion of the recording comprises substantially an entire recording regardless of the start time.

17. The method of claim 10, further comprising:
generating an analysis of a plurality of tags, wherein the plurality of tags comprises the first tag; and
transmitting a fifth signal to the first terminal and the second terminal, wherein the fifth signal instructs the first terminal and the second terminal to display at least a portion of the analysis.

18. The method of claim 17, further comprising:
receiving, from the second terminal, a sixth signal associated with the first tag, and a seventh signal comprising a second remark from the second user; and
generating, based on the sixth signal and the seventh signal, a second tag that comprises the first tag and the second remark.

19. The method of claim 10 wherein the first portion of the recording has a predetermined duration.

20. A method comprising:
generating, via a processor and during a communication session between a first user and a second user, an analysis of a plurality of tags associated with a recording comprising an audio output of the communication session, wherein at least one of the plurality of tags comprises a remark from at least one of the first user and the second user, and wherein the at least one of the plurality of tags is associated with a portion of the recording; and
transmitting, during the communication session, a first signal to a first terminal associated with the first user and a second terminal associated with the second user, wherein the first signal instructs the first terminal and the second terminal to display at least a portion of the analysis during the communication session and concurrently with at least a second portion of the plurality of tags.

21. The method of claim 20, further comprising:
in response to a second signal that is based on a first tag from the plurality of tags, transmitting a second portion of the recording that is associated with the first tag, wherein the second signal is received from at least one of the first terminal, the second terminal, and a third terminal.

22. The method of claim 20 further comprising:
in response to a second signal that is based on an identity of the first user, retrieving, from the plurality of tags, all tags that are associated with the identity of the first user, wherein the second signal is received from at least one of the first terminal, the second terminal, and a third terminal.

* * * * *